United States Patent
Ando et al.

(10) Patent No.: US 7,921,986 B2
(45) Date of Patent: Apr. 12, 2011

(54) HOISTING AND LOWERING DRIVING ENGAGEMENT MULTI-ROW CHAIN

(75) Inventors: Takahisa Ando, Osaka (JP); Toshihiko Takashima, Osaka (JP); Takeshi Kondo, Osaka (JP); Michio Oitaka, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 77 days.

(21) Appl. No.: 12/508,270

(22) Filed: Jul. 23, 2009

(65) Prior Publication Data
US 2010/0044190 A1    Feb. 25, 2010

(30) Foreign Application Priority Data
Aug. 22, 2008   (JP) ................. 2008-214193

(51) Int. Cl.
   *B65G 17/12*  (2006.01)
(52) U.S. Cl. ............ 198/468.6; 414/560; 254/358
(58) Field of Classification Search ........... 198/346.3, 198/468.6, 468.8, 850, 851, 853; 414/560, 414/561; 254/358
   See application file for complete search history.

(56) References Cited

U.S. PATENT DOCUMENTS

| | | | |
|---|---|---|---|
| 3,624,756 A | 11/1971 | Mellgren | |
| 3,951,282 A * | 4/1976 | Keller | 414/561 |
| 4,114,773 A * | 9/1978 | Sekiguchi | 198/468.8 |
| 4,219,057 A | 8/1980 | Falk | |
| 4,574,854 A | 3/1986 | Lindblom | |
| 6,138,820 A * | 10/2000 | Ewert | 198/850 |
| 7,267,222 B2 * | 9/2007 | Montemartini et al. | 198/853 |
| 7,500,555 B1 * | 3/2009 | Liao | 198/850 |
| 7,731,013 B2 * | 6/2010 | Milner et al. | 198/468.6 |
| 7,810,636 B2 * | 10/2010 | Jenny | 198/831 |
| 7,819,389 B2 * | 10/2010 | Takeuchi et al. | 254/358 |

FOREIGN PATENT DOCUMENTS

| | | |
|---|---|---|
| FR | 2550988 | 3/1985 |
| GB | 2070906 | 9/1981 |
| JP | 3370928 | 11/2002 |

OTHER PUBLICATIONS

Search Report mailed Sep. 1, 2010 for French Application FR 1050818.

* cited by examiner

*Primary Examiner* — James R Bidwell
(74) *Attorney, Agent, or Firm* — Maschoff Gilmore & Israelsen

(57) ABSTRACT

Aspects of the invention provide a hoisting and lowering driving engagement multi-row chain in which the weight of the chain is balanced across the chain width direction so as to improve the load balance. This allows the weight of articles to be hoisted and lowered more stably hoisted and at higher positions, and results in an improvement of endurance of the chain, reduction of driving noise, miniaturization of the chain size, while the biasing or deflecting of intermediate tooth plates and inner tooth plates in the chain width direction is suppressed.

9 Claims, 9 Drawing Sheets

HOISTING AND LOWERING DRIVING ENGAGEMENT MULTI-ROW CHAIN

CROSS-REFERENCE TO RELATED APPLICATIONS

The entire disclosure of Japanese Patent Application No. 2008-214193, filed Aug. 22, 2008 is expressly incorporated herein by reference.

BACKGROUND OF THE INVENTION

1. The Field of the Invention

The present invention relates to a hoisting and lowering driving engagement multi-row chain. More particularly, the present invention relates to a hoisting and lowering driving engagement multi-row chain which is incorporated into a hoisting and lowering device, which hoists and lowers a hoisting and lowering table in parallel with a set surface. Such hoisting and lowering devices may be used as production facilities in various kinds of production fields, transfer facilities in the transportation field, care facilities in the medical welfare field, stage facilities in the art field, and the like.

2. The Relevant Technology

One example of a hoisting and lowering device is a so called chuck chain, which hoists and lowers articles, such as heavy articles, using an engagement chain, which is integrally formed with the table T, which is used to lift and lower the articles, such as the chain described in Japanese Patent Publication No. JP-3370928, which is shown in FIG. 1.

As shown in FIG. 8, one example of such an engagement chain, is a multi-row engagement chain 500 in which a plurality of inner link units 530 each comprising a pair of right and left inner plates 510 and a pair of front and rear bushes 520, which are press-fitted into the inner plates 510. The inner plates and rear bushes 520 are arranged through intermediate plates 540 in a chain width direction.

In such a multi-row engagement chain 500, inner plates 510, intermediate plates 540 and outer plates 550 are generally formed using a blanking process using the same blanking material with the same shaped metal mold in the same direction so as to enhance production efficiency. The inner plate 510, intermediate plate 540 and outer plate 550 are formed so as to have flat surface-shaped sheared surface cross-sections X at rear portions in the blanking direction, while having rough surface-shaped sheared surface cross-sections Y at front portions in the blanking direction.

As shown in FIG. 8, inner plates 510, intermediate plates 540 and outer plates 550 are respectively arranged with hook portions which are directed toward the same longitudinal direction of the plate and extended toward the same height direction of the plate. As the result, as shown in FIG. 9, each of the shear planes X and break surfaces Y in the respective plates in a plate thickness direction are aligned. One problem with this alignment, however, is that a weight bias is generated over the length of the entire chain due to a weight difference generated between the break surface side Y, which has a relatively lighter weight, and the shear plane side X, which has a relatively heavier weight. This unequal distribution of weight is made more burdensome when the weight of articles to be hoisted and lowered in the chain width direction are added, often resulting in drive noise and shortened chain life.

Further, when the engagement chain 500 is particularly lengthened in the longitudinal direction of the chain so that the hoisting height of the articles to be hoisted and lowered is set higher, the engagement chain 500 may twist in a fixed direction while the chain is hoisted, in accordance with the above-described deterioration of the load balance of the engagement chain 500. This results in additional problems, as the inner plates 510, intermediate plates 540, and outer plates 550 in a pair of engagement chains 500 become disengaged and buckle.

Accordingly, the purpose of the present invention is to solve at least some of these problems, that is the object of the present invention is to provide a hoisting and lowering driving engagement multi-row chain in which the weight balance of the whole chain over the chain width direction is controlled so as to improve the load balance with respect to the weight of articles to be hoisted and lowered and the like, so that the articles to be hoisted and lowered may be stably hoisted at higher positions. Thus, a purpose of the present invention is an improvement of endurance of the chain, a reduction of driving noise and miniaturization of the chain size while suppressing the biasing or deflecting of intermediate tooth plates and inner tooth plates.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

These and other limitations are overcome by embodiments of the invention which relate to a hoisting and lowering driving engagement multi-row chain. More particularly, the present invention relates to an improved design for a hoisting and lowering driving engagement multi-row chain which is capable of more equally distributing the weight of the chain so as to improve the performance and durability of the chain.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One aspect of the invention is a hoisting and lowering driving engagement multi-row chain, each row of the chain comprising at least two inner link units, each inner link unit including a right and left inner tooth plate arranged in parallel with a front and a rear bush press-fitted between the inner tooth plates in the chain width direction, wherein each of the inner tooth plates has a hook portion and a front and a rear pin hole, where the front and the rear bushes are press-fitted into the front and rear pin hole, respectively, at least two intermediate tooth plates, each intermediate tooth plate having a hook portion and a front and a rear pin hole, at least two outer tooth plates, each having a hook portion and a front and a rear pin hole, and connecting pins which are fitted into the front and rear pin holes of the right and left inner tooth plate, intermediate tooth plates, and outer tooth plates, so that the intermediate tooth plates are disposed in parallel between adjacent inner link units and the outer tooth plates are disposed on the outermost sides of the chain in the chain width direction. The hook portions of the right and left inner tooth plate, intermediate tooth plates, and outer tooth plates are configured to engage with the right and left inner tooth plate, intermediate tooth plates, and outer tooth plates of an opposing row of the multi-row chain when being raised and lowered in the vertical direction when a pair of hoisting and lowering sprockets engages with the bushes, so that the opposing rows of the multi-row chain are integrally raised and lowered and then become disengaged when the opposing rows are moved from the vertical direction to the horizontal direction by the hoisting and lowering sprockets. The right and left inner tooth plate, intermediate tooth plates, and outer tooth plates are all formed of the same material using the same mold in the same orientation, so as to have the same shape, and at least one plate of the right and left inner tooth plate, intermediate tooth plates, and outer tooth plates has a reverse configuration than the remaining plates so that the hook portion of the at least one plate extends in the opposite direction than the hook portion of the remaining plates.

Because the chain can be raised and lowered in an engaged state, it is possible to quickly raise and lower the chain. Furthermore, since the inner link units are arranged in parallel with each other in the chain width direction, it is possible to create any number of configurations which have an equal weight distribution across the width of the chain. As a result, it is possible to suppress buckling in the chain width direction, and more equally balance the chain with the hoisting and lowering sprocket in the chain width direction is improved.

Furthermore, since the outer tooth plate, the inner tooth plate and the intermediate tooth plate are each formed using the same material and mold at the same orientation, it is possible to achieve a simplified design, while alternating the hook portions of the plates so as to more equally distribute the weight of the chain in the chain width direction. This decreases the torque within the chain and improves the load balance of the chain as it is raised and lowered.

Further, as described above, since the load balance in the chain width direction is improved, it is possible to more reliably raise and lower articles without generating torque, twisting, and bucking of the hoisting and lowering driving engagement multi-row chain so that endurance of the chain can be improved. And the drive noise liable to occur during a chain operation can be reduced. Additionally since the bucking strength of the hoisting and lowering driving engagement multi-row chain is improved as mentioned above, it is possible to reduce the size of the chain.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to a hoisting and lowering driving engagement multi-row chain. More particularly, the present invention relates to a hoisting and lowering driving engagement multi-row chain which is incorporated into a hoisting and lowering device, which hoists and lowers a hoisting and lowering table in parallel with a set surface.

A hoisting and lowering driving engagement multi-row chain 100, which is a first embodiment of the present invention, will be described with reference to drawings.

Figure 1:
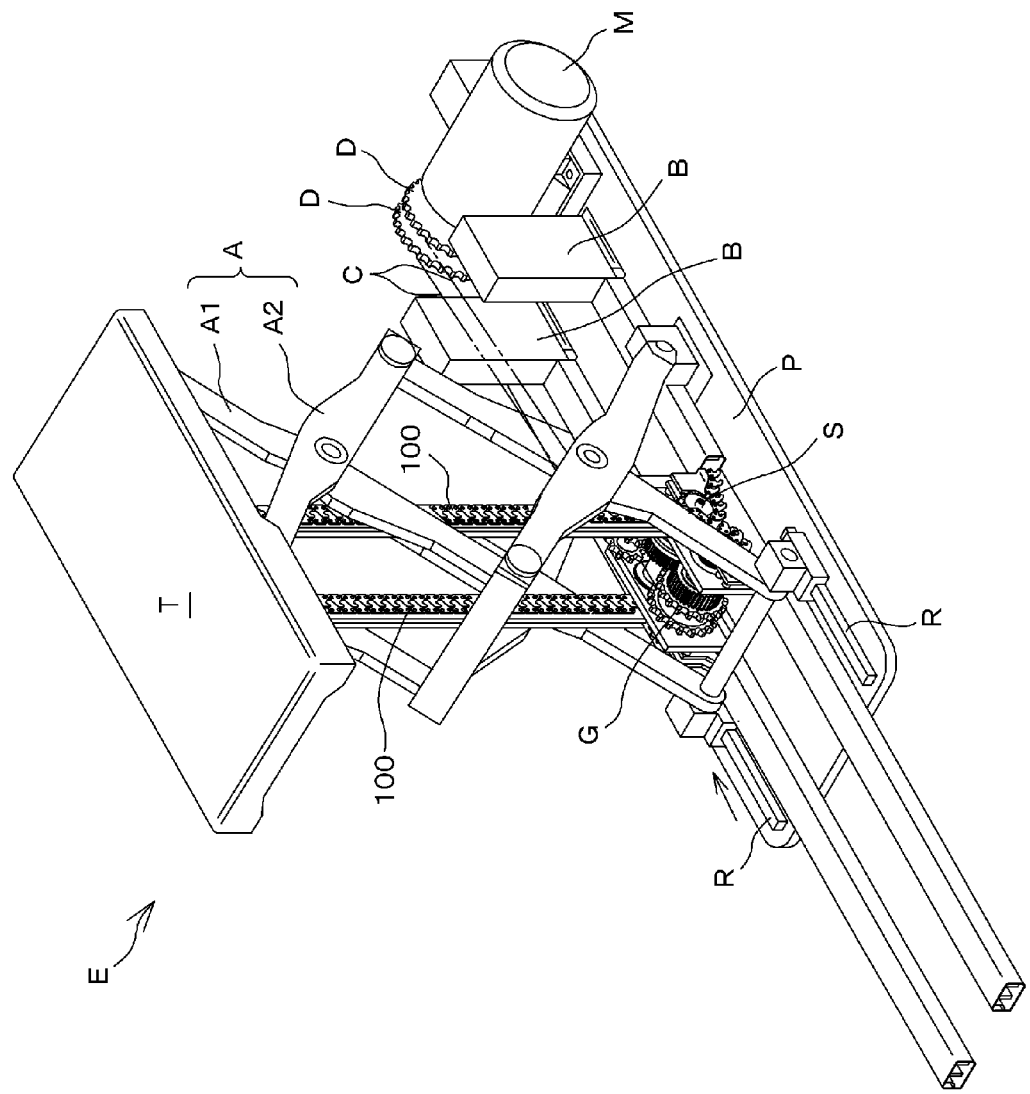
FIG. 1 illustrates a hoisting and lowering driving multi-row chain, according to a first embodiment of the present invention.
Figure 2:
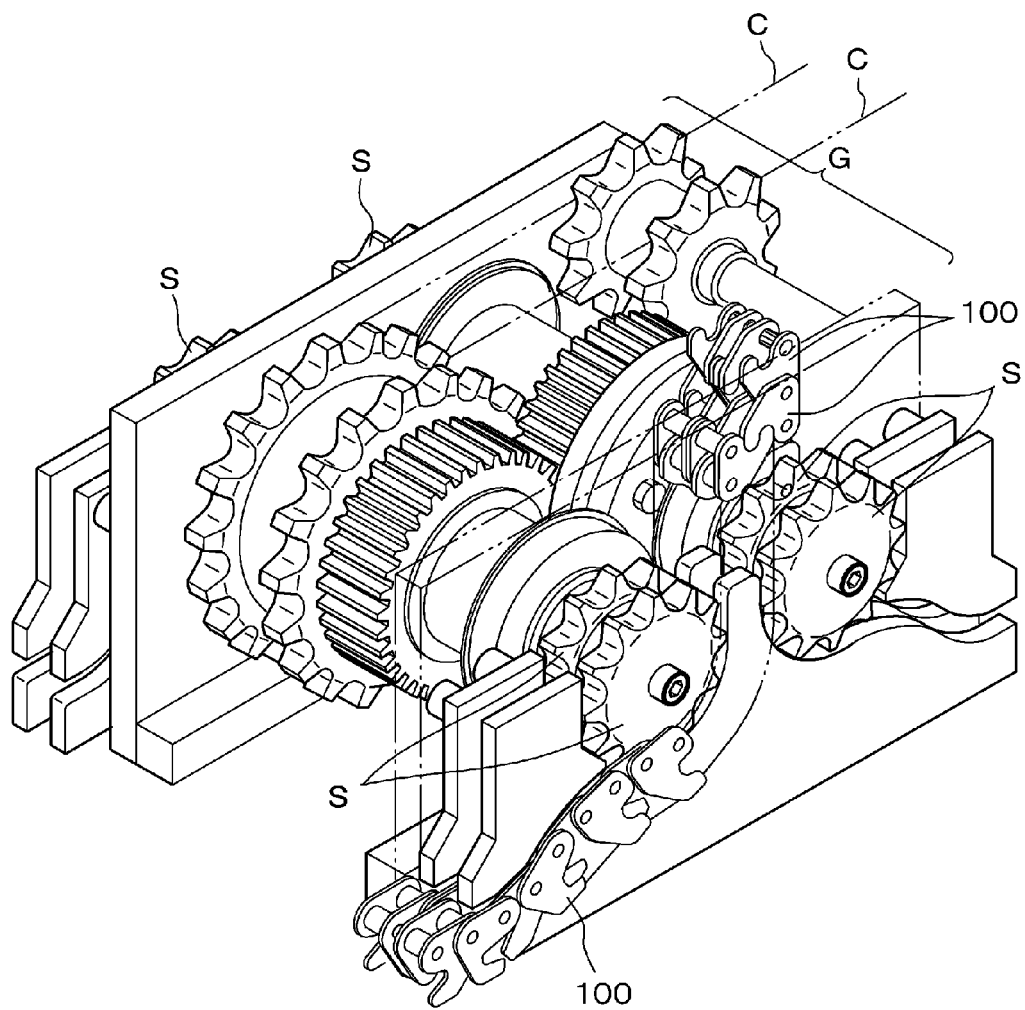
FIG. 2 is a perspective view of a multi-row chain, with the hoisting and lowering table and a pantograph arm are removed.

Here, FIG. 1 illustrates a hoisting and lowering driving multi-row chain 100, which is a first example of the present invention, while FIG. 2 is a perspective view of a the chain with the hoisting and lowering table and a pantograph arm are removed. As shown in FIG. 1, the hoisting and driving engagement multi-row chain 100, which is a first embodiment of the present invention, is incorporated into an engagement chain type hoisting and lowering device E, which is set on an operating floor surface in a stationary state for hoisting and lowering a hoisting and lowering table T on which articles to be hoisted and lowered such as heavy articles (not shown) are loaded in parallel with a setting surface.

As shown in FIGS. 1 and 2, the engagement chain type hoisting and lowering device E comprises a base plate P mounted on a setting surface where the above-described hoisting and lowering table T is hoisted and lowered in parallel with the setting surface, a pair of hoisting and lowering sprockets S, which rotate forward and in reverse, while facing each other in the same plane about a pair of rotating shafts arranged in parallel with the base plate P. The device E also includes a pair of hoisting and lowering driving engagement multi-row chains 100, which are disengaged from the hoisting and lowering sprockets S to hoist and lower the hoisting and lowering table T, and the hoisting and lowering table T, which is securely attached to an upper end of the hoisting and lowering driving engagement multi-row chains 100, so as to be integrally hoisted and lowered therewith. The device E includes a driving motor M, which drives the pair of hoisting and lowering sprockets S.

A pair of driving sprockets D are coaxially arranged on an output shaft side of the driving motor M, while a pair of power transmission chains C composed of roller chains transmit power from the driving sprockets D to a side of a pair of hoisting and lowering sprockets S. A synchronous gear group G, which transmits power from the pair of power transmission chains C to the pair of hoisting and lowering sprockets S so that the sprockets S are rotated in positive and reverse rotations, with their rotations being opposite to each other. The raising and lowering arms A comprise hoisting and lowering auxiliary guide means composed of an inner arm A1 and an outer arm A2 called as an X-shaped pantograph arm. The arms A are provided between the hoisting and lowering table T and a setting surface side base plate P, with a slide rail R being formed where a lower end of the inner arm A1 is slid in accordance with a hoisting and lowering operation. A winding type chain accommodating box B accommodates one of a pair of hoisting and lowering driving engagement multi-row chain 100 when disengaged and branched from the rest of the chain.

Figure 3:
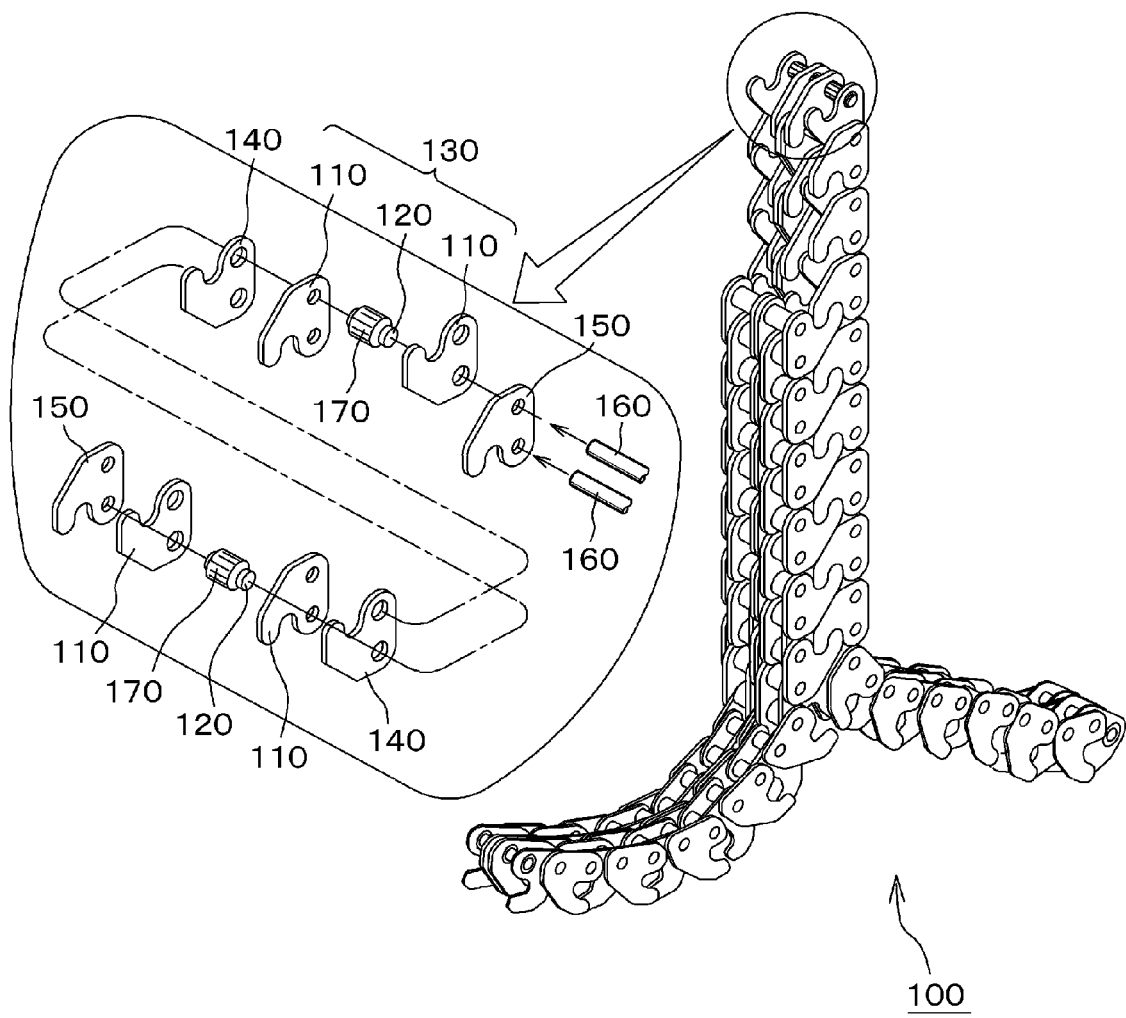
FIG. 3 is a partially enlarged view showing a hoisting and lowering driving multi-row chain.
Figure 4:
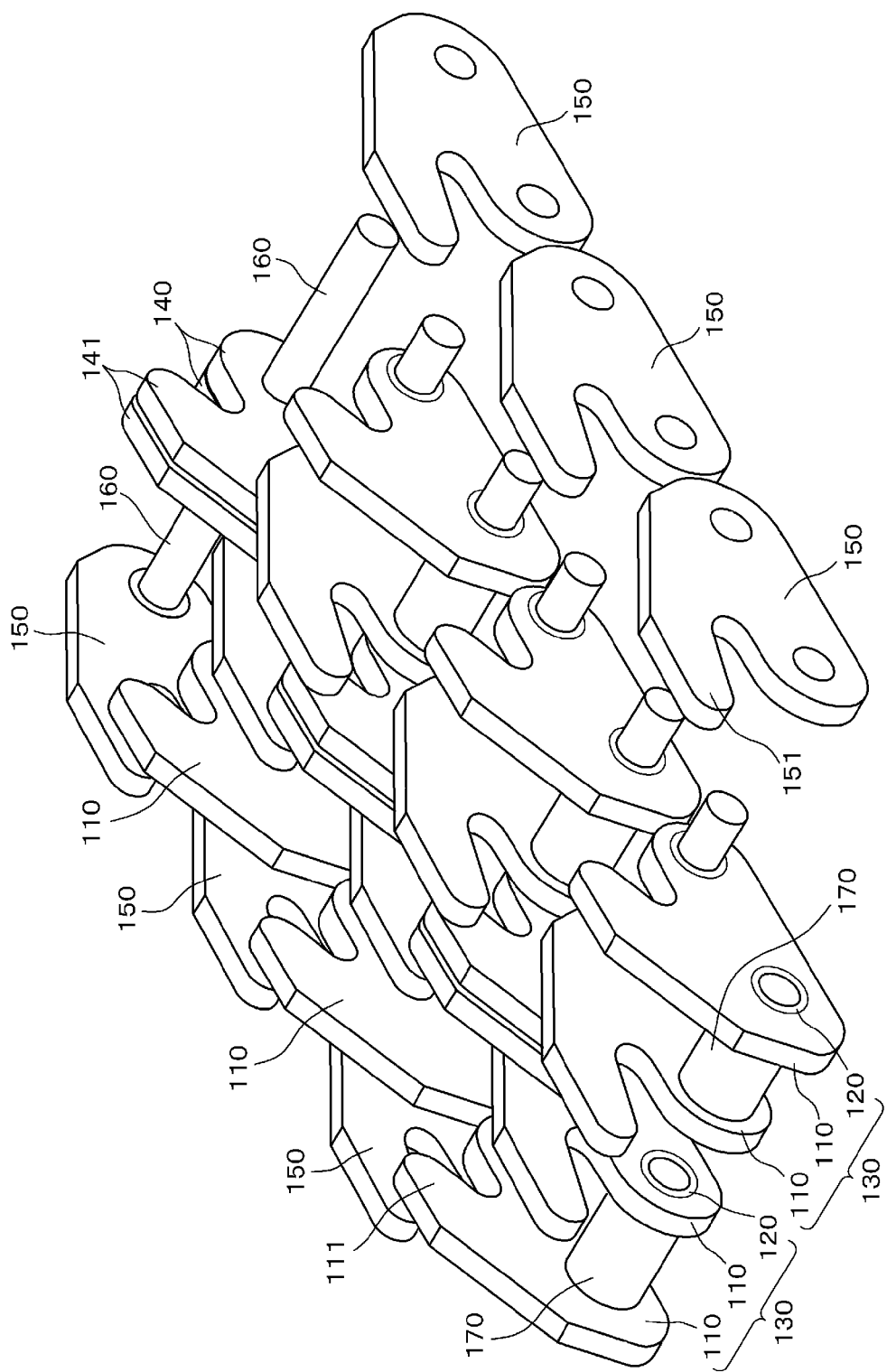
FIG. 4 is an exploded view illustrating the a hoisting and lowering driving multi-row chain.
Figure 5:
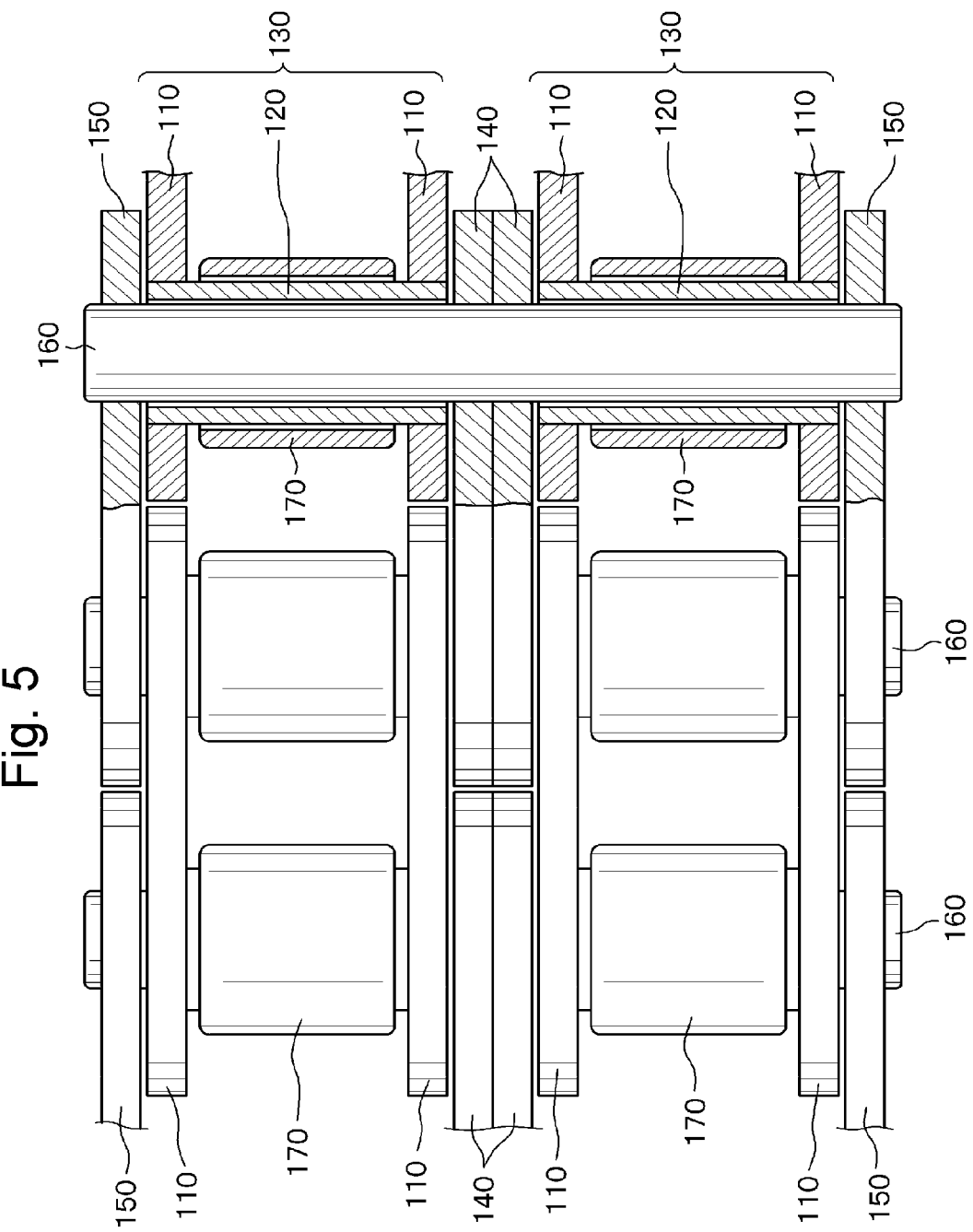
FIG. 5 is a partial cross-sectional view illustrating a hoisting and lowering driving engagement multi-row chain.

As shown in FIGS. 3 to 5, the chain 100 includes inner link units 130 each comprising a pair of right and left spaced inner tooth plates 110 having hook portions 111 and a pair of front and rear bushes 120, which are press-fitted into the inner tooth plates 110. The inert link units 130 are arranged in parallel with each other through two intermediate tooth plates 140 having hook portions 141 in the chain width direction, and a number of inner link units 130 are connected to each other in the longitudinal direction of the chain by pairs of front and rear connecting pins 160, which are press-fitted into front and rear pin holes of outer tooth plates 150. The outer tooth plates 150 have hook portions 151 arranged on the outermost sides in the chain width direction. A roller 170 is fitted onto an outer circumference of the bush 120.

Since the inner link units 130 are arranged in parallel with each other in the chain width direction, an inner tooth plate 110, an intermediate tooth plate 140 and an outer tooth plate 150, form one segment of the pair of hoisting and lowering driving engagement multi-row chain 100, which engages with another opposing segment comprising an inner tooth plate 110, an intermediate tooth plate 140 and an outer tooth plate 150. These opposing segments form a plurality of rows in the chain direction in a hooked-shaped manner respectively, so called as a chuck-shaped manner, such that the chain is capable of suppressing any buckling that is liable to occur in the chain width direction of the hoisting and lowering driving engagement multi-row chain 100, and the engagement balance with a hoisting and lowering sprocket S in the chain width direction can be improved.

Further, the two opposing segments of the hoisting and lowering driving engagement chain 100 are respectively oppositely arranged, so that respectively facing inner tooth plates 110, outer tooth plates 150 and intermediate tooth plates 140 engage with each other so as to be integrally hoisted. Then, the pair of hoisting and lowering driving engagement multi-row chains 100, the inner tooth plates 110, the outer tooth plates 150 and the intermediate tooth plates 140 disengage from each other and branch out when turning from the vertical direction to the horizontal direction by use of the above-mentioned pair of hoisting and lowering sprockets S.

Here, the shapes of an inner tooth plate, an outer tooth plate 150 and an intermediate tooth plate 140, which are the most characteristic in the hoisting and lowering driving engagement multi-row chain 100 of Example 1, will be described in more detail with reference to FIGS. 3 to 6.

Figure 6:
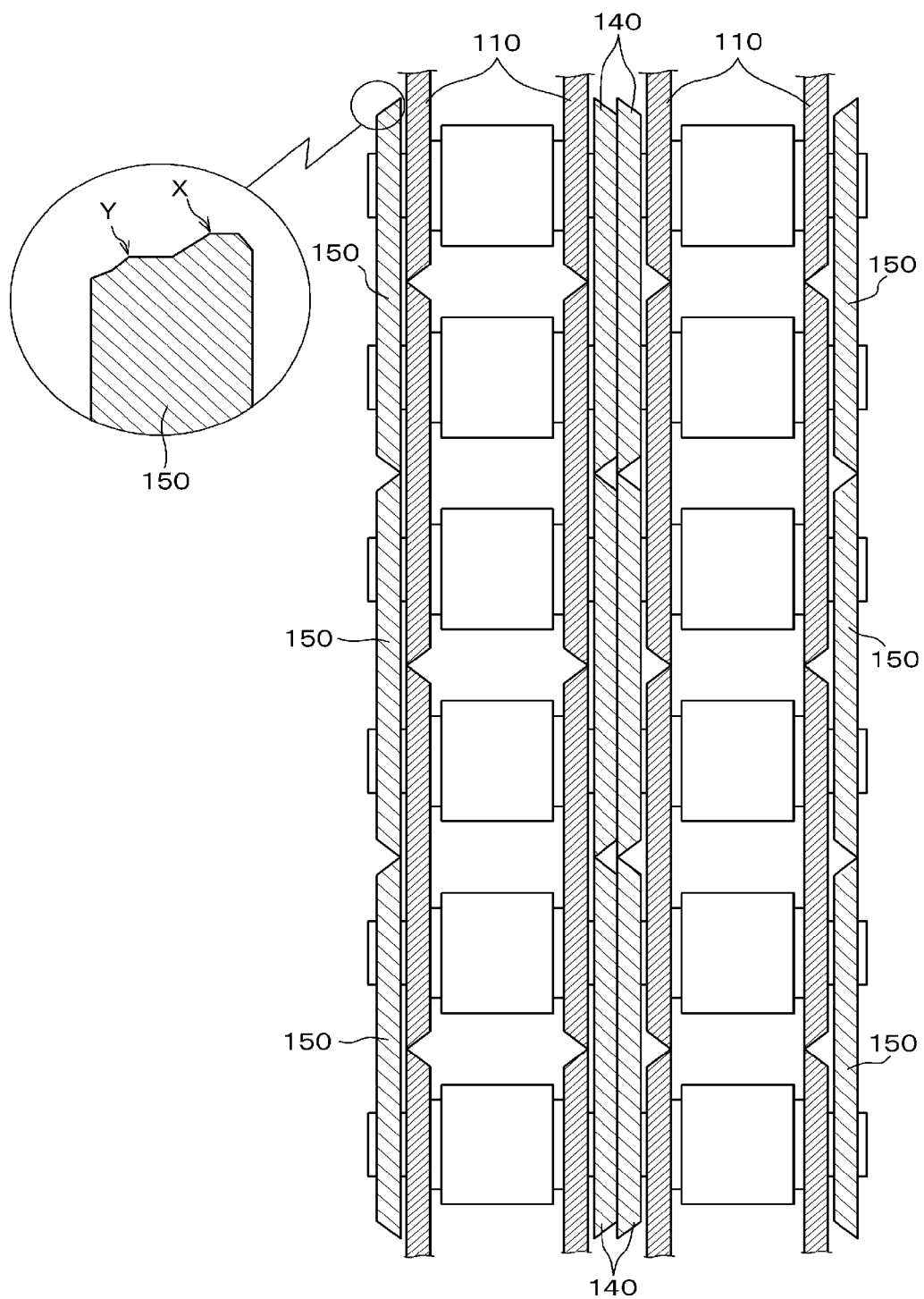
FIG. 6 is a schematic view of the weight balance of a hoisting and lowering driving multi-row chain.

First, the outer tooth plates 150, the inner tooth plates 110, and the intermediate tooth plates 140 are respectively formed so as to have the same shape using the same shaped mold on the same blanking material in the same direction. Then, the outer tooth plates 150, the inner tooth plates 110, and the intermediate tooth plates 140 are connected together in an alternating pattern in the chain width direction using connecting pins 160, as shown in FIG. 6. More specifically, the two inner tooth plates 110, adjacent to intermediate tooth plates 140, and two outer tooth plates 150, are arranged so that hook portions 141 protrude in the same direction, which is opposite to the direction that all the hook portions 151 protrude.

It is noted that in plate cutting faces of the inner tooth plate 110, the outer tooth plate 150 and the outer tooth plate 140 inclinations generated by their shear surfaces X and break surfaces Y are shown in an exaggerated state in FIG. 6, so as to clarify the aspects of the invention.

As shown in FIGS. 4 and 5, the intermediate tooth plate 140 is press-fitted into the connecting pin 160.

In the resulting hoisting and lowering driving engagement multi-row chain 100, the outer tooth plate 150, the inner tooth plate 110 and said intermediate tooth plate 140 are each formed using the same blanking material with the same-shaped metal mold in the same direction. Then, the chain is assembled so that half of the outer tooth plates 150, inner tooth plates 110 and intermediate tooth plates 140, are connected to the remaining plates with connecting pins 160 in an alternating configuration in the chain width direction.

Because of this alternating configuration, even if the inner tooth plates 110, the outer tooth plates 150 and the intermediate tooth plates 140 produced biases of their weights in the plate width direction due to the weight difference generated between weights on a shear plane X side formed at a rear portion in the blanking direction and on a break surface Y side formed at a front portion in the blanking direction, the weight balance of the whole chain over the chain width direction is equally distributed and uniform. Therefore, the tension in the hoisting and lowering driving engagement multi-row chain 100 along the chain width direction is suppressed so that a load balance with respect to the weight of articles to be hoisted and lowered can be improved.

Further, as described above, since the load balance in the chain width direction is improved, the articles to be hoisted and lowered can be more stably hoisted to a higher position without generating any torque within the chain or buckling, improving the endurance of the chain. And the drive noise liable to occur during a chain operation can be reduced. Additionally since the bucking strength of the hoisting and lowering driving engagement multi-row chain 100 is improved as mentioned above, it is possible to reduce the size of the chain.

The intermediate tooth plates 140 are press-fitted onto the connecting pin 160. Because the positions of the intermediate tooth plates 140 are fixed with respect to the connecting pin 160 to substantially the center of the chain in the chain width direction, any biases of the intermediate tooth plates 140 and the inner tooth plates 110 in the chain width direction are suppressed so that the load balance in the chain width direction can be remarkably improved.

Further, even when a load due is added to the chain 100 to weight of articles being raised and lowered, because there is no clearance between the pin hole of the intermediate tooth plate 140 and a connecting pin 160, there is a reduced torque applied to the connecting pin 160. This means that that the bending of the connecting pin 160 can be suppressed, so that fatigue failure liable to occur due to the bending of the connecting pin 160 can be prevented. And as described above, since the bending of the connecting pin 160 is suppressed, the load balance in the chain width direction is remarkably improved so that fatigue strength of the chain can be improved.

As described above, since there is no clearance between the pin hole and the connecting pin of the intermediate tooth plate, the torque applied between the intermediate tooth plates 140 and the connecting pin 160 can be suppressed, even when the weight of articles to be hoisted and lowered is added to the chain 100. Thus the action of a partial excessive load on the connecting pin 160 can be avoided. Therefore, the benefits of first embodiment are very large.

Next, a hoisting and lowering driving engagement multi-row chain 200, which is a second example of the present invention, will be described with reference to FIG. 7.

Because the hoisting and lowering driving engagement multi-row chain 200 has similar components as the first embodiment, for purposes of simplicity, similar components have similar reference numbers.

The specific configuration of the inner tooth plate 210 and the outer tooth plate 250, which are the most characteristic in the hoisting and lowering driving engagement multi-row chain 200 of the second embodiment, will be described in detail.

Figure 7:
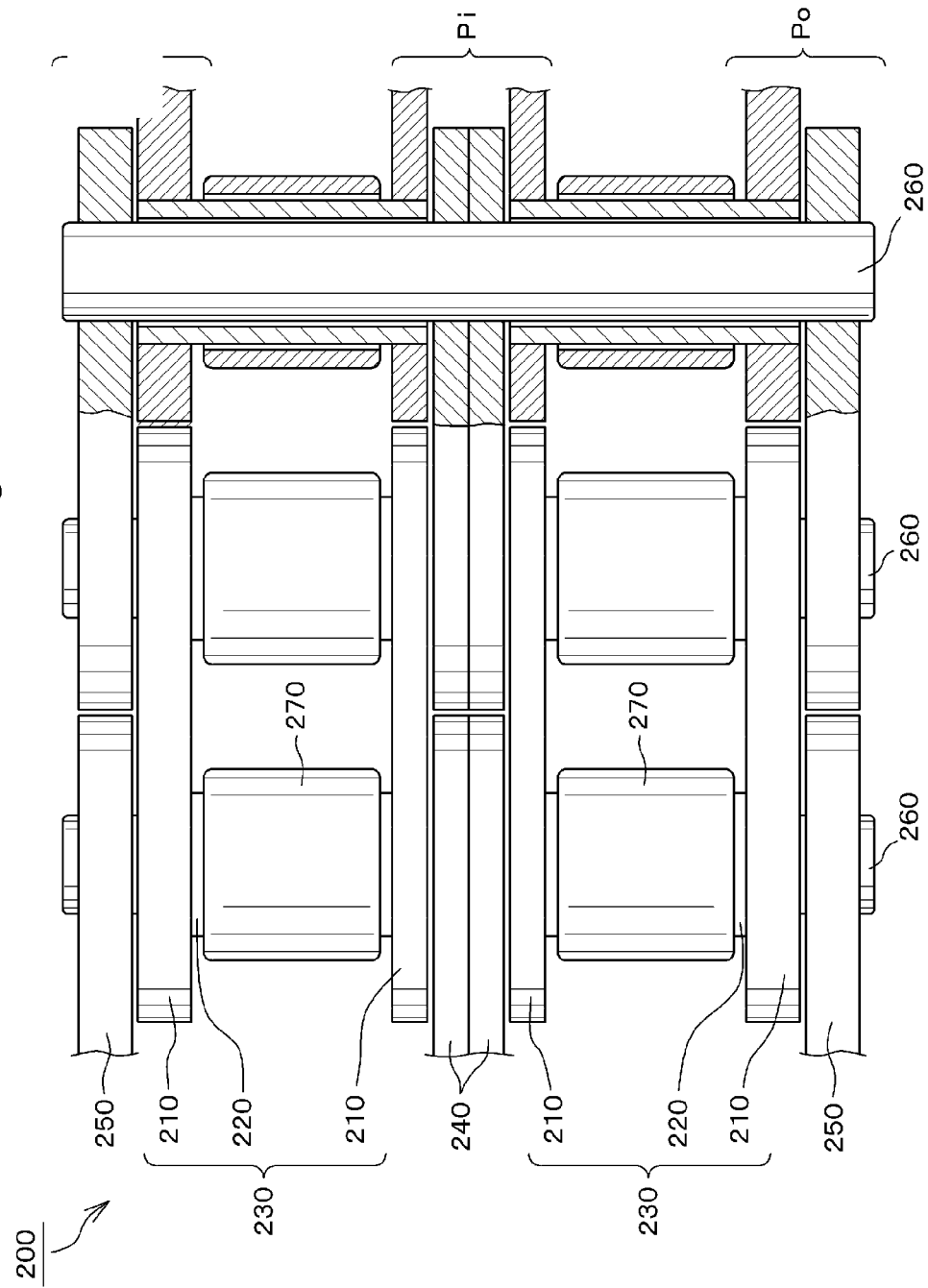
FIG. 7 is a partial cross-sectional view showing a hoisting and lowering driving multi-row chain according to a second embodiment of the present invention.
Figure 8:
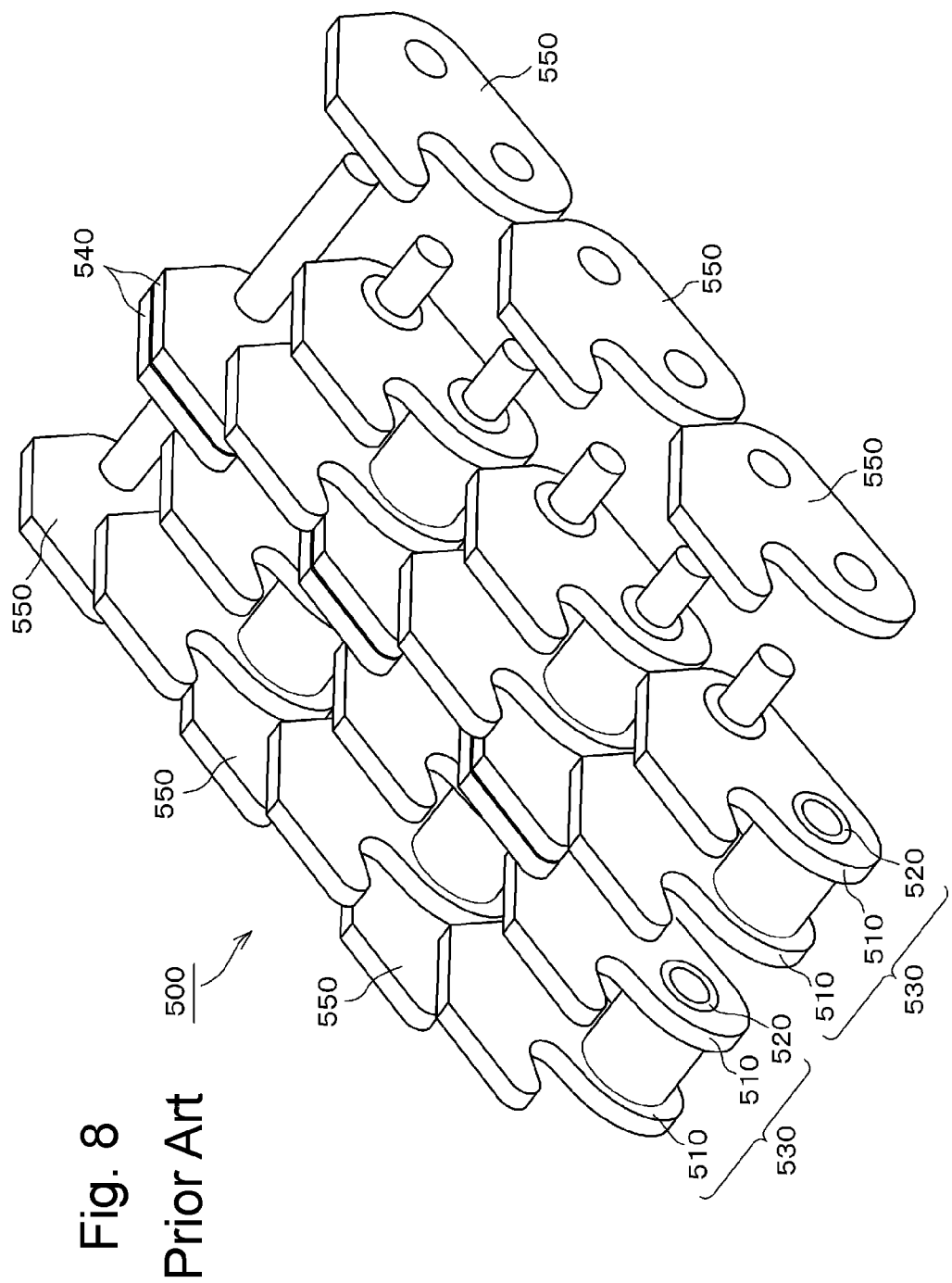
FIG. 8 is a perspective view showing a conventional engagement chain currently known in the art.
Figure 9:
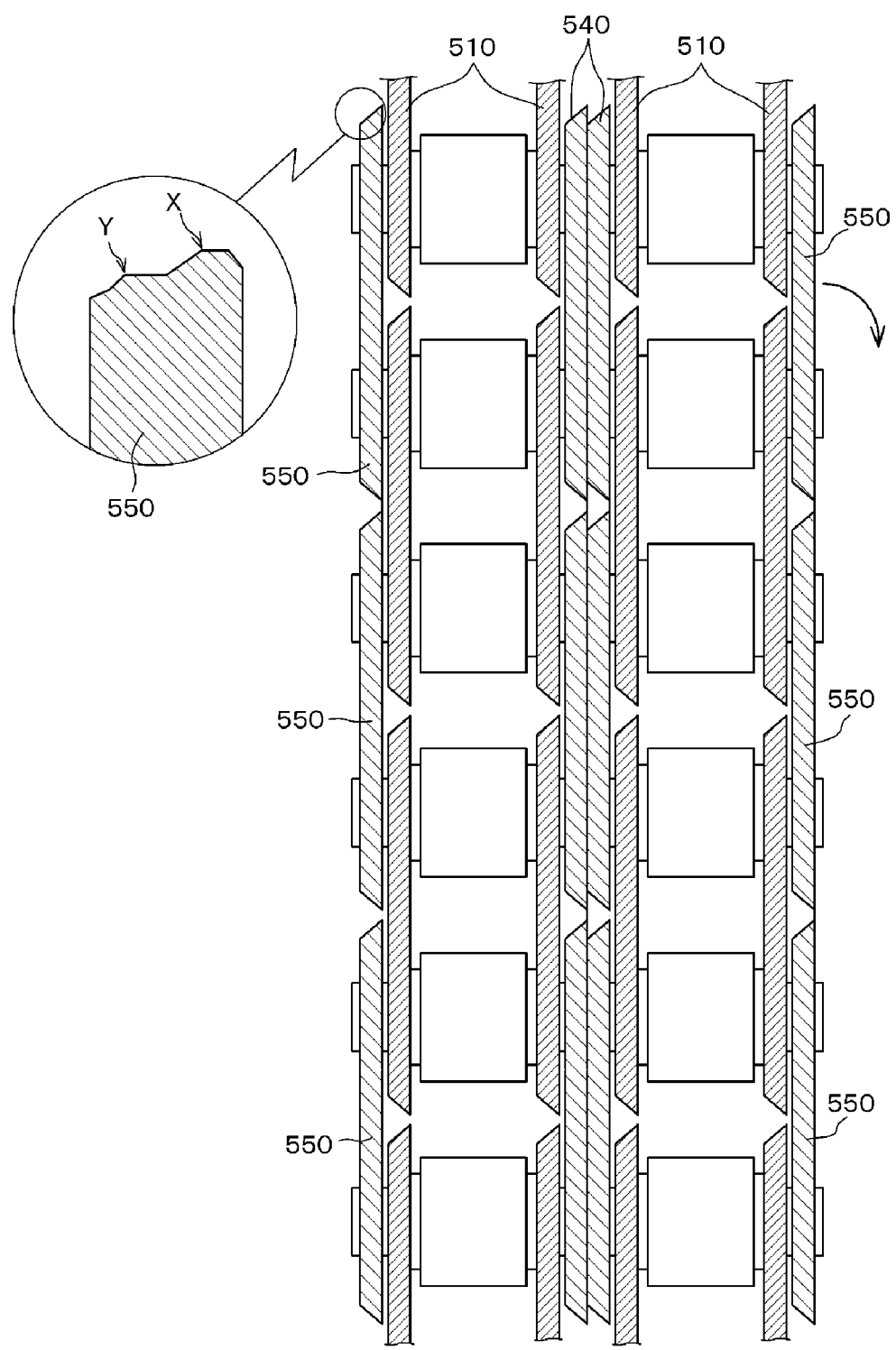
FIG. 9 is a schematic view illustrating the weight balance of a conventional engagement chain in the chain width direction.

As shown in FIG. 7, outer tooth plates 250 arranged on the outermost sides in the chain width direction and inner tooth plates 210 adjacent to the outer tooth plates 250, are formed so as to have a plate thickness which is larger than the remaining plates.

Therefore, the difference between the total weight of an inside plates group Pi in the chain width direction composed of intermediate tooth plates 240 and inner tooth plates 210 adjacent to the intermediate tooth plates 240 and having a larger number of the plates and the total weight of an outside plates group Po in the chain width direction composed of outer tooth plates 250 and inner tooth plates 210 adjacent to the outer tooth plates 250 and having a smaller number of the plates, is decreased. Thus a bias of the weight to the inside in the chain width direction is avoided so that an adjustment of the weight balance in the chain width direction can be attained. Therefore, the effects of Example 2 are very large.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A hoisting and lowering driving engagement multi-row chain, each row of the chain comprising:
   at least two inner link units, each inner link unit including a right and left inner tooth plate arranged in parallel with a front and a rear bush press-fitted between the inner tooth plates in the chain width direction, wherein each of the inner tooth plates has a hook portion and a front and a rear pin hole, where the front and the rear bushes are press-fitted into the front and rear pin hole, respectively;
   at least two intermediate tooth plates, each intermediate tooth plate having a hook portion and a front and a rear pin hole;
   at least two outer tooth plates, each having a hook portion and a front and a rear pin hole; and
   connecting pins which are fitted into the front and rear pin holes of the right and left inner tooth plate, intermediate tooth plates, and outer tooth plates, so that the intermediate tooth plates are disposed in parallel between adjacent inner link units and the outer tooth plates are disposed on the outermost sides of the chain in the chain width direction,
   wherein the hook portions of the right and left inner tooth plate, intermediate tooth plates, and outer tooth plates are configured to engage with the right and left inner tooth plate, intermediate tooth plates, and outer tooth plates of an opposing row of the multi-row chain when being raised and lowered in the vertical direction when a pair of hoisting and lowering sprockets engages with the bushes, so that the opposing rows of the multi-row chain are integrally raised and lowered and then become disengaged when the opposing rows are moved from the vertical direction to the horizontal direction by the hoisting and lowering sprockets,
   wherein the right and left inner tooth plate, intermediate tooth plates, and outer tooth plates are all formed of the same material using the same mold in the same orientation, so as to have the same shape, and
   wherein at least one plate of the right and left inner tooth plate, intermediate tooth plates, and outer tooth plates has a reverse configuration than the remaining plates so that the hook portion of the at least one plate extends in the opposite direction than the hook portion of the remaining plates.

2. The hoisting and lowering driving engagement multi-row chain according to claim 1, wherein half of the plates in the group comprising the right and left inner tooth plate, intermediate tooth plates, and outer tooth plates have the reverse configuration wherein the hook portion of the plates in the group extends in the opposite direction than the hook portion.

3. The hoisting and lowering driving engagement multi-row chain according to claim 1, wherein the intermediate tooth plates are press-fitted onto said connecting pins.

4. The hoisting and lowering driving engagement multi-row chain according to claim 1, wherein the intermediate tooth plates are loosely fitted onto said connecting pins.

5. The hoisting and lowering driving engagement multi-row chain according to claim 1, wherein the outer tooth plates and inner tooth plates are formed so as to have a plate thickness larger than the remaining plates.

6. A hoisting and lowering driving engagement multi-row chain, each row of the chain comprising:
   at least two inner link units, each inner link unit including a right and left inner tooth plate arranged in parallel with a front and a rear bush press-fitted between the inner tooth plates in the chain width direction, wherein each of the inner tooth plates has a hook portion and a front and a rear pin hole, where the front and the rear bushes are press-fitted into the front and rear pin hole, respectively;
   at least two intermediate tooth plates, each intermediate tooth plate having a hook portion and a front and a rear pin hole;
   at least two outer tooth plates, each having a hook portion and a front and a rear pin hole; and
   connecting pins which are fitted into the front and rear pin holes of the right and left inner tooth plate, intermediate tooth plates, and outer tooth plates, so that the intermediate tooth plates are disposed in parallel between adjacent inner link units and the outer tooth plates are disposed on the outermost sides of the chain in the chain width direction,
   wherein the hook portions of the right and left inner tooth plate, intermediate tooth plates, and outer tooth plates are configured to engage with the right and left inner tooth plate, intermediate tooth plates, and outer tooth plates of an opposing row of the multi-row chain when being raised and lowered in the vertical direction when a pair of hoisting and lowering sprockets engages with the bushes, so that the opposing rows of the multi-row chain are integrally raised and lowered and then become disengaged when the opposing rows are moved from the vertical direction to the horizontal direction by the hoisting and lowering sprockets,
   wherein the right and left inner tooth plate, intermediate tooth plates, and outer tooth plates are all formed of the same material using the same mold in the same orientation, so as to have the same shape, and wherein the plates are positioned in the chain width direction such that the right inner tooth plate and intermediate tooth plates have a hook portion that extends in a first direction, while the left inner tooth plate and the outer tooth plates have a hook portion that extends in a second direction which is opposite to the first direction.

7. The hoisting and lowering driving engagement multi-row chain according to claim 6, wherein the intermediate tooth plates are press-fitted onto said connecting pins.

8. The hoisting and lowering driving engagement multi-row chain according to claim 6, wherein the intermediate tooth plates are loosely fitted onto said connecting pins.

9. The hoisting and lowering driving engagement multi-row chain according to claim 6, wherein the outer tooth plates and inner tooth plates are formed so as to have a plate thickness larger than the remaining plates.

* * * * *